United States Patent
Park et al.

(10) Patent No.: US 11,183,691 B2
(45) Date of Patent: Nov. 23, 2021

(54) METAL-DOPED POSITIVE ELECTRODE ACTIVE MATERIAL FOR HIGH VOLTAGE

(71) Applicant: LG Chem, Ltd., Seoul (KR)

(72) Inventors: Sungbin Park, Daejeon (KR); Younguk Park, Daejeon (KR); Jiyoung Park, Daejeon (KR); Bo Ram Lee, Daejeon (KR); Chi Ho Jo, Daejeon (KR); Hyuck Hur, Daejeon (KR); Wang Mo Jung, Daejeon (KR)

(73) Assignee: LG Chem, Ltd.

( * ) Notice: Subject to any disclaimer, the term of this patent is extended or adjusted under 35 U.S.C. 154(b) by 166 days.

(21) Appl. No.: 16/242,712

(22) Filed: Jan. 8, 2019

(65) Prior Publication Data

US 2019/0221845 A1    Jul. 18, 2019

Related U.S. Application Data

(63) Continuation of application No. PCT/KR2017/015118, filed on Dec. 20, 2017.

(30) Foreign Application Priority Data

Dec. 21, 2016   (KR) .................... 10-2016-0175204
Dec. 18, 2017   (KR) .................... 10-2017-0174513

(51) Int. Cl.
*H01M 4/525* (2010.01)
*H01M 4/131* (2010.01)
(Continued)

(52) U.S. Cl.
CPC ............ *H01M 4/525* (2013.01); *C01G 51/42* (2013.01); *H01M 4/131* (2013.01); *H01M 4/133* (2013.01);
(Continued)

(58) Field of Classification Search
CPC ........ H01M 4/131; H01M 4/525; C01G 51/42
See application file for complete search history.

(56) References Cited

U.S. PATENT DOCUMENTS

| | | | |
|---|---|---|---|
| 2004/0191628 A1 | 9/2004 | Inoue et al. | |
| 2007/0224505 A1 | 9/2007 | Kita et al. | |

(Continued)

FOREIGN PATENT DOCUMENTS

| | | | |
|---|---|---|---|
| CN | 1532967 A | 9/2004 | |
| CN | 1585167 A | 2/2005 | |

(Continued)

OTHER PUBLICATIONS

Levasseur S, Ménétrier M, Delmas C. On the dual effect of Mg doping in LiCoO2 and Li1+ dCoO2: structural, electronic properties, and 7Li MAS NMR studies. Chemistry of materials Aug. 19, 2002;14(8):3584-90. XP-002758419.

(Continued)

*Primary Examiner* — Jonathan G Jelsma
(74) *Attorney, Agent, or Firm* — Lerner, David, Littenberg, Krumholz & Mentlik, LLP (57) ABSTRACT

Provided are a metal element-doped positive electrode active material for a high voltage and a preparation method thereof. The positive electrode active material may include a lithium cobalt oxide having a layered crystal structure; and a metal element (M) incorporated into the lithium cobalt oxide in an amount of 0.2 parts by weight to 1 part by weight with respect to 100 parts by weight of the lithium cobalt oxide, wherein the metal element (M) does not form a chemical bond with the elements of the lithium cobalt oxide, and wherein the layered crystal structure in maintained at a positive electrode potential of more than 4.5 V (based on Li potential) when fully charged.

11 Claims, 6 Drawing Sheets
(2 of 6 Drawing Sheet(s) Filed in Color)

(51) Int. Cl.

| | |
|---|---|
| *C01G 51/00* | (2006.01) |
| *H01M 4/36* | (2006.01) |
| *H01M 4/133* | (2010.01) |
| *H01M 4/134* | (2010.01) |
| *H01M 10/0525* | (2010.01) |
| *H01M 4/02* | (2006.01) |

(52) U.S. Cl.
CPC ......... *H01M 4/134* (2013.01); *H01M 4/366* (2013.01); *C01P 2002/20* (2013.01); *C01P 2002/52* (2013.01); *C01P 2002/72* (2013.01); *C01P 2002/89* (2013.01); *C01P 2004/84* (2013.01); *C01P 2006/40* (2013.01); *H01M 10/0525* (2013.01); *H01M 2004/027* (2013.01); *H01M 2004/028* (2013.01); *Y02E 60/10* (2013.01); *Y02T 10/70* (2013.01)

(56) References Cited

U.S. PATENT DOCUMENTS

| | | | |
|---|---|---|---|
| 2011/0008675 A1* | 1/2011 | Yi | C01G 51/42 429/207 |
| 2011/0315917 A1 | 12/2011 | Chang et al. | |
| 2012/0028134 A1 | 2/2012 | Kim et al. | |
| 2014/0000100 A1 | 1/2014 | Oh et al. | |
| 2014/0234718 A1 | 8/2014 | Lee et al. | |
| 2015/0104704 A1 | 4/2015 | Kim et al. | |
| 2015/0147655 A1 | 5/2015 | Park et al. | |
| 2015/0162598 A1* | 6/2015 | Kim | H01M 4/364 429/223 |
| 2016/0020456 A1 | 1/2016 | Song et al. | |
| 2016/0141619 A1 | 5/2016 | Lee et al. | |
| 2016/0156032 A1 | 6/2016 | Lee et al. | |
| 2016/0181609 A1 | 6/2016 | Shin et al. | |
| 2017/0222211 A1 | 8/2017 | Ryu et al. | |
| 2018/0040888 A1* | 2/2018 | Park | H01M 10/0569 |

FOREIGN PATENT DOCUMENTS

| | | |
|---|---|---|
| CN | 1763997 A | 4/2006 |
| CN | 101071859 A | 11/2007 |
| CN | 102804458 A | 11/2012 |
| CN | 103636049 A | 3/2014 |
| CN | 104584284 A | 4/2015 |
| CN | 105118991 A | 12/2015 |
| CN | 105189361 A | 12/2015 |
| CN | 105431970 A | 3/2016 |
| CN | 105449197 A | 3/2016 |
| CN | 105958038 A | 9/2016 |
| EP | 2851988 A1 | 3/2015 |
| JP | 2001297768 A | 10/2001 |
| JP | 2007258122 A | 10/2007 |
| JP | 2007265758 A | 10/2007 |
| KR | 20090111130 A | 10/2009 |
| KR | 20110116094 A | 10/2011 |
| KR | 20130122279 A | 11/2013 |
| KR | 20130141772 A | 12/2013 |
| KR | 20140018137 A | 2/2014 |
| KR | 20150021008 A | 2/2015 |
| KR | 20160040116 A | 4/2016 |
| KR | 20160064881 A | 6/2016 |
| WO | 2013157734 A1 | 10/2013 |
| WO | 2016029856 A1 | 3/2016 |
| WO | 2016053054 A1 | 4/2016 |

OTHER PUBLICATIONS

Liu A, Li J, Shunmugasundaram R, Dahn JR. Synthesis of Mg and Mn Doped LiCoO2 and Effects on High Voltage Cycling. Journal of The Electrochemical Society. Jan. 1, 2017;164(7):A1655-64. XP-55590644.

Needham SA, Wang GX, Liu HK, Drozd VA, Liu RS. Synthesis and electrochemical performance of doped LiCoO2 materials. Journal of Power Sources. Dec. 6, 2007;174(2):828-31. XP25917654.

Tukamoto H, West AR. Electronic conductivity of LiCoO2 and its enhancement by magnesium doping. Journal of The Electrochemical Society. Sep. 1, 1997;144(9):3164-8. XP55151511.

Extended European Search Report Including Written Opinion for EP17884634.1 dated May 31, 2019.

Search report from International Application No. PCT/KR2017/015118, dated Mar. 30, 2018.

Search Report from First Chinese Office Action for Application No. 201780036217X dated Jan. 26, 2021; 2 pages.

Wang Z, Liu L, Chen L, Huang X. Structural and electrochemical characterizations of surface-modified LiCoO2 cathode materials for Li-ion batteries. Solid state ionics. Jun. 2, 2002;148(3-4):335-42.

Mladenov M, Stoyanova R, Zhecheva E, Vassilev S. Effect of Mg doping and MgO-surface modification on the cycling stability of LiCoO2 electrodes. Electrochemistry Communications. Aug. 1, 2001, 3(8):41 0-6.

Search Report from 3rd Office Action for Chinese Application No. 201780036217.X dated Aug. 25, 2021; 4 pages.

\* cited by examiner

METAL-DOPED POSITIVE ELECTRODE ACTIVE MATERIAL FOR HIGH VOLTAGE

CROSS-REFERENCE TO RELATED APPLICATIONS

The present application is continuation of International Application No. PCT/KR2017/015118 filed Dec. 20, 2017, which claims priority from Korean Patent Application Nos. 10-2016-0175204 and 10-2017-0174513, filed on Dec. 21, 2016 and Dec. 18, 2017, respectively, the disclosures of which are incorporated herein by reference.

TECHNICAL FIELD

The present invention relates to a metal-doped positive electrode active material for a high voltage and a preparation method thereof.

BACKGROUND

With increasing technology developments and demands for mobile devices, demands for secondary batteries as an energy source have rapidly increased, and among such secondary batteries, lithium secondary batteries having high energy density and working potential, a long lifespan, and a low self-discharge rate have been commercialized and widely used.

Further, with growing concerns about environmental issues, many studies have been conducted on electric vehicles and hybrid electric vehicles which may be employed in place of vehicles using fossil fuels, such as gasoline vehicles, diesel vehicles, etc. which are one of major causes of air pollution. Although nickel hydrogen metal secondary batteries have been mainly used as a power source of the electric vehicles and hybrid electric vehicles, use of lithium secondary batteries having high energy density and discharge voltage has been actively studied, and some of them are now commercially available.

As a positive electrode material for the lithium secondary battery, $LiCoO_2$, ternary materials (NMC/NCA), $LiMnO_4$, $LiFePO_4$, etc. are used. $LiCoO_2$ has excellent physical properties such as high rolling density, etc., and excellent electrochemical properties such as high cycling property, and therefore, it has been frequently used until now. However, since $LiCoO_2$ has a charge/discharge current capacity as low as about 150 mAh/g, and its structure is unstable at a high voltage of 4.3 V or more, it has problems of a rapid reduction of lifespan characteristics and ignition caused by reactions with an electrolyte.

In particular, when a high voltage is applied to $LiCoO_2$ in order to develop a high capacity secondary battery, Li usage of $LiCoO_2$ is increased, which may increase possibility of surface instability and structural instability. To solve these problems, positive electrode materials have been developed by replacing part of cobalt with other elements, instead of $LiCoO_2$, or by forming a separate coating layer.

However, it is also difficult to improve structural stability of $LiCoO_2$ in the positive electrode materials having the replacement or the coating layer. In particular, it is difficult to maintain the structural stability at a high voltage of more than 4.5 V. Actually, application of $LiCoO_2$ to high capacity secondary batteries was difficult.

Further, with regard to the positive electrode material having the coating layer which is formed on the surface of $LiCoO_2$, the coating layer interrupts movement of Li ions during charge/discharge cycling or decreases the capacity of $LiCoO_2$, and therefore, there is a problem that performances of the secondary batteries may deteriorate.

Accordingly, there is a continuous demand for a lithium cobalt oxide-based positive electrode active material capable of ensuring structural stability without deterioration of performances at high voltages of more than 4.5 V.

DISCLOSURE

Technical Problem

Accordingly, the present invention provides a positive electrode active material capable of ensuring structural stability without deterioration of performances at high voltages of more than 4.5 V, and a preparation method thereof.

Further, the present invention provides a positive electrode including the positive electrode active material, and a lithium secondary battery which includes the positive electrode to exhibit excellent performances and lifespan characteristics at high voltages of more than 4.5 V.

Technical Solution

Accordingly, the present invention provides a positive electrode active material including a lithium cobalt oxide having a layered crystal structure, which is represented by the following Formula 1; and a metal element (M) which is incorporated into the lithium cobalt oxide in an amount of 0.2 parts by weight to 1 part by weight with respect to 100 parts by weight of the lithium cobalt oxide, wherein the layered crystal structure is maintained at a positive electrode potential of higher than 4.5 V (based on Li potential) when fully charged:

$Li_{1+x}Co_{1-x}O_2$ [Formula 1]

wherein x satisfies $0 \leq x \leq 0.2$; and

M is one or more selected from the group consisting of Al, Ti, Mg, Mn, Zr, Ba, Ca, Ta, Mo, Nb, and metals having an oxidation number of +2 or +3.

Further, the present invention provides a lithium secondary battery including a positive electrode including the positive electrode active material; a negative electrode; and an electrolyte.

Further, the present invention provides a method of preparing the positive electrode active material, the method including dry-mixing a cobalt acid salt, a lithium precursor, and a doping precursor; and sintering the mixture at a temperature of 900° C. or higher.

Hereinafter, a positive electrode active material according to a specific embodiment of the present invention and a preparation method thereof will be described.

According to one embodiment of the present invention, provided is a positive electrode active material including a lithium cobalt oxide having a layered structure, which is represented by the following Formula 1; and a metal element (M) which is doped into the lithium cobalt oxide in an amount of 0.2 parts by weight to 1 part by weight with respect to 100 parts by weight of the lithium cobalt oxide, wherein the layered crystal structure is maintained at a positive electrode potential of higher than 4.5 V (based on Li potential) when fully charged:

$Li_{1+x}Co_{1-x}O_2$ [Formula 1]

wherein x satisfies $0 \leq x \leq 0.2$; and

M is one or more selected from the group consisting of Al, Ti, Mg, Mn, Zr, Ba, Ca, Ta, Mo, Nb, and metals having an oxidation number of +2 or +3.

The present inventors have continued intensive studies, and as described in more detail below, they found that when a lithium cobalt oxide having a layered structure of Formula 1 is doped with one or more metal elements in a predetermined amount or more, structural stability of the layered crystal structure may be improved at high voltages of more than 4.5 V to maintain a stable layered crystal structure, thereby achieving high-voltage characteristics, leading to the present invention.

As used herein, the "doping" of the metal element into the lithium cobalt oxide means that the metal element does not form a chemical bond with the lithium cobalt oxide and elements thereof, but at least part of the metal element M is incorporated into a crystal lattice structure (e.g., layered crystal structure) of the lithium cobalt oxide to have a physical/crystallographic connection. In this regard, at least part of the metal element M incorporated into the crystal lattice structure of the lithium cobalt oxide may be, for example, incorporated into the empty space of the crystal lattice structure of the lithium cobalt oxide to have a physical/crystallographic connection without formation of a chemical bond with the lithium cobalt oxide. As such, since the metal element M has the physical/crystallographic connection without formation of a chemical bond with the lithium cobalt oxide, the metal element M may be predominantly distributed in the region close to the surface of the lithium cobalt oxide.

Therefore, the "doping" may be clearly distinguished from a state in which the metal element M forms a chemical bond with the lithium cobalt oxide, for example, a complex state in which part of cobalt in the lithium cobalt oxide is replaced by the metal element M, which is then chemically bonded to oxide. In the complex state, the metal element M may be uniformly distributed throughout the entire region of the lithium cobalt oxide by the chemical bond or formation of the complex.

As such, the positive electrode active material of one embodiment has a structure based on the lithium cobalt oxide of Formula 1 which is doped with one or more metal elements, and therefore, a predetermined amount or more of the dopants is incorporated into and placed in the crystal lattice of the lithium cobalt oxide, thereby improving stability of the crystal structure and particle surface.

Particularly, the positive electrode active material of one embodiment may include the dopant in a predetermined amount or more, for example, 0.2 parts by weight or more, or 0.2 parts by weight to 1.0 parts by weight, or 0.3 parts by weight to 0.9 parts by weight, thereby stabilizing the crystal structure of lithium cobalt oxide even at high voltages of 4.3 V or more, or more than 4.5 V. Therefore, it was confirmed that the positive electrode active material may be preferably applied as an active material showing excellent capacity and lifespan characteristics at high voltages.

In contrast, when the dopant is doped in a small amount of less than 0.2 parts by weight, the positive electrode active material is excellent in terms of capacity and structural stability up to 4.45 V. However, at a voltage of higher than 4.5 V, there are problems in that collapse of the structure occurs or rapid lifespan deterioration occurs. Further, when the dopant is doped in an excessively large amount of more than 1.0 part by weight, or when the metal element form a complex via a chemical bond with lithium cobalt oxide (e.g., a complex having replacement of part of cobalt by metal element M), rather than doping, or when a coating layer including the metal element is formed, structural stability of the active material may deteriorate at high voltages, the replaced element or the coating layer may interrupt movement of Li ions during charge/discharge cycling, or capacity characteristics of the active material based on Formula 1 may deteriorate due to relative reduction of the cobalt content.

Figure 6:
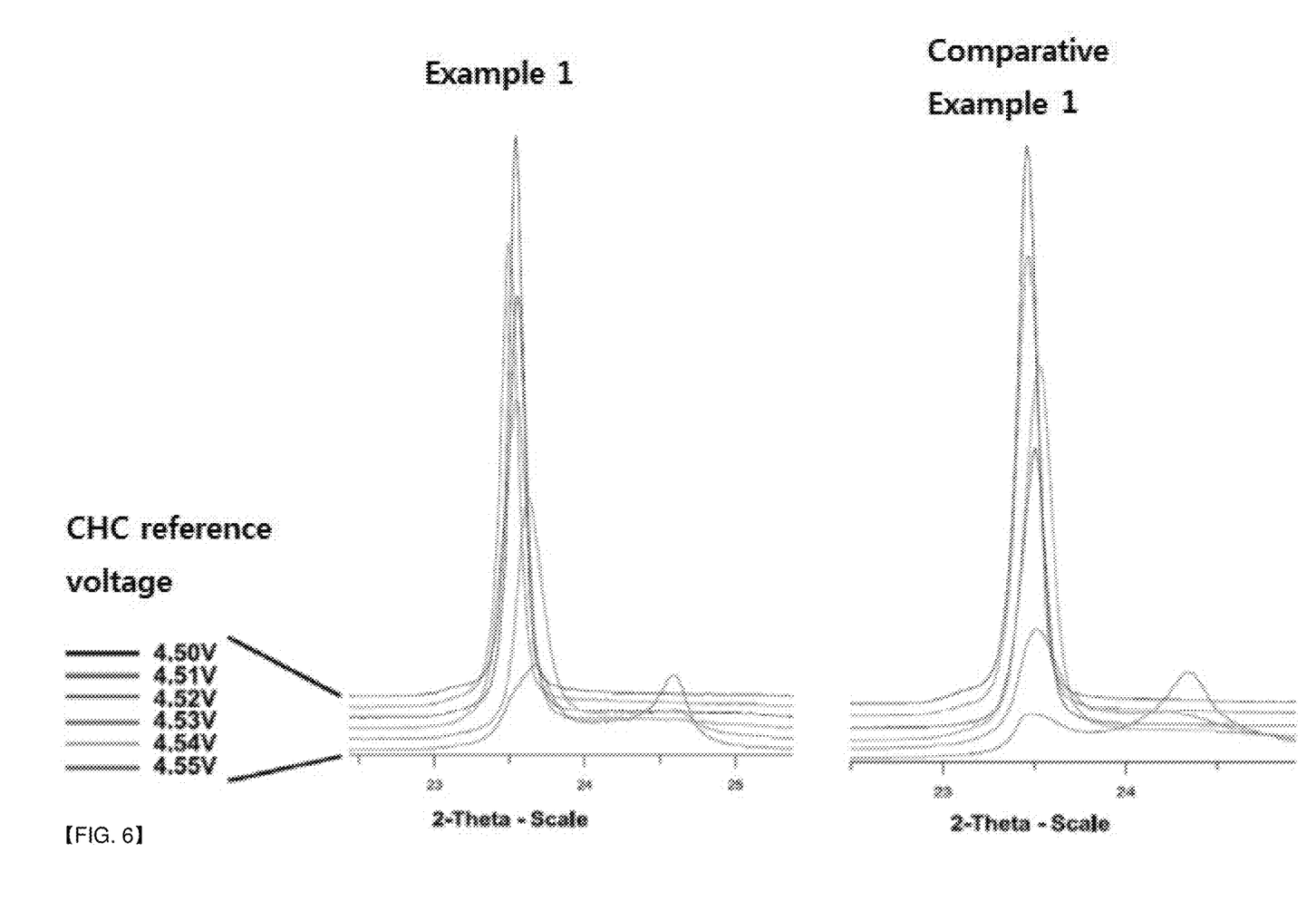
FIG. 6 is an XRD graph showing a peak intensity of a coin-type half cell including the positive electrode active material of Example 1 or Comparative Example 1, as measured while increasing an upper limit voltage from 4.5 V to 4.54 V at 0.01 V intervals.

Meanwhile, incorporation of at least part of the metal element M into the crystal lattice of the lithium cobalt oxide by doping may be confirmed from, for example, results of analyzing the above-described active material by TOF-SIMS (Time of flight secondary ion mass spectrometry) analysis, as shown in FIG. 6. It was confirmed that the metal element M was predominantly distributed in the region close to the surface of lithium cobalt oxide, indicating that at least part of the metal element M was doped into the lithium cobalt oxide without complex formation via a chemical bond with the lithium cobalt oxide.

Additionally, in one specific embodiment, the crystal structure of the positive electrode active material may be maintained in the charge range of more than 4.5 V and 4.8 V or less, particularly, the stability of the crystal structure may be maintained in the charge range of more than 4.5 V and 4.6 V or less, and more particularly, in the charge range of more than 4.5 V and 4.55 V or less.

The above-described dopant, metal element M may be selected from the metal element group consisting of Al, Ti, Mg, Mn, Zr, Ba, Ca, Ta, Mo, Nb, and metals having an oxidation number of +2 or +3 without particular limitation. However, considering reduction of surface side-reactions with an electrolyte or phase stability at high voltages, the metal element M may be Al or Mg. In some cases, all of Al and Mg may be used as the dopants.

Meanwhile, in another specific embodiment, the positive electrode active material of one embodiment may maintain crystal structural stability when charged at a high voltage, and this stability may be confirmed by X-Ray Diffraction (XRD) analysis. For example, on 2θ scale of the XRD analysis results of the positive electrode active material, a peak intensity of an XRD peak corresponding to a (003) plane in the crystal structure of lithium cobalt oxide when measured at a positive electrode potential of 4.55 V may be 30% or more of a peak intensity of the XRD peak corresponding to the (003) plane when measured at 4.50 V. More particularly, on 2θ scale of XRD graph, the peak intensity of the XRD peak corresponding to the (003) plane when measured at 4.55 V may be 40% or more, or 40% to 90% of the peak intensity of the XRD peak corresponding to the (003) plane when measured at 4.50 V.

In other words, whether or not the lithium cobalt oxide maintains the crystal structure may be confirmed by measuring the peak intensity of the XRD peak corresponding to the (003) plane in the crystal structure of lithium cobalt oxide which is a crystal plane indicating an entrance of lithium ions in lithium cobalt oxide. The previous lithium cobalt oxide showed collapse of the crystal structure when charged up to 4.55 V, and thus a remarkably low peak intensity was measured, as compared with a peak intensity of 4.5 V. Therefore, it can be seen that when the lithium cobalt oxide has no metal doping or a small amount of doping, collapse of the crystal structure may occur at a voltage of more than 4.5 V.

However, since the positive electrode active material of one embodiment includes the particular content and kind of the dopant, the peak intensity of the XRD peak corresponding to the (003) plane when measured at 4.55 V may be 30% or more of the peak intensity of the XRD peak corresponding to the (003) plane when measured at 4.5 V, indicating improvement in the structural stability at high voltages.

In still another embodiment, at a positive electrode potential of 4.5 V (based on Li potential) when fully charged, a positive electrode active material having the doping content (b) of the metal element (M) of 0.3 parts by weight may exhibit a low capacity retention ratio relative to that of a positive electrode active material having the doping content of the metal element (M) of 0.1 parts by weight.

As such, even though the doping content of the metal element is relatively high, the capacity retention ratio may be lowered at a potential of 4.5 V when fully charged, due to the high content of the dopant. Therefore, to achieve a high capacity retention ratio, the positive electrode active material of one embodiment is required to have a high content of the doping metal as well as a charge voltage of at least higher than 4.5 V.

For example, when the doping metal element is Mg, a positive electrode active material having the Mg content of 0.3 parts by weight may exhibit a low capacity retention ratio relative to that of a positive electrode active material having the Mg doping content of 0.1 parts by weight after charge/discharge cycles of 30 cycles or more.

That is, when the lithium cobalt positive electrode active material is doped with Mg and the content of Mg is 0.3 parts by weight, the positive electrode active material exhibits a higher capacity retention ratio than the positive electrode active material having the Mg content of 0.1 parts by weight after charge/discharge cycles of less than 30 cycles, but it exhibits a lower capacity retention ratio than the positive electrode active material having the Mg content of 0.1 parts by weight after charge/discharge cycles of 30 cycles or more.

Accordingly, at the charge voltage of 4.5 V, even if a large amount of the dopant is used, the capacity retention ratio may be lowered and the lifespan characteristics may be deteriorated with increasing charge/discharge cycle number.

In contrast, at a positive electrode potential of 4.55 V (based on Li potential) when fully charged, the positive electrode active material having the doping content (b) of the metal element (M) of 0.3 parts by weight may exhibit a high capacity retention ratio relative to that of the positive electrode active material having the doping content of the metal element (M) of 0.1 parts by weight.

As such, to achieve a high capacity retention ratio at a high charge voltage of more than 4.5 V, the positive electrode active material of one embodiment is required to include the dopant in a predetermined amount or more. Unlike the case at the charge voltage of 4.5 V, although the doping metal is Mg, the positive electrode active material having the doping content of 0.3 parts by weight may exhibit a high capacity retention ratio relative to that of the positive electrode active material having the doping content of 0.1 parts by weight after the charge/discharge cycle of 30 cycles or more.

Further, at the charge voltage of 4.55 V, a difference in the capacity retention ratio between the positive electrode active material having the doping metal content of 0.3 parts by weight and the positive electrode active material having the doping metal content of 0.1 parts by weight gradually increases with increasing charge/discharge cycle number.

For example, when the positive electrode active material having the doping metal content of 0.3 parts by weight is used, its capacity retention ratio after the charge/discharge cycle of 50 cycles may be 85% or more of the initial capacity, at a positive electrode potential of 4.55 V (based on Li potential) when fully charged, indicating high lifespan characteristics, as compared with the positive electrode active material having the doping metal content of 0.1 parts by weight which generally exhibits a capacity retention ratio of less than 75% after the same cycles.

In one specific embodiment, the above-described positive electrode active material of one embodiment may further include a coating layer which is formed on the lithium cobalt oxide particle, and the coating layer may include one or more metal oxides selected from the group consisting of $Al_2O_3$, $MgO$, $ZrO$, $Li_2ZrO_3$, and $TiO_2$. Formation of the coating layer may further improve structural stability of the lithium cobalt oxide particles.

In general, when lithium cobalt oxide is used as the positive electrode active material at a high voltage, a large amount of lithium ions is released from the lithium cobalt oxide particles, and the concentration of Li ions on the surface becomes low and thus Co is easily released. As the release of Co is increased, reversible capacity is decreased, and the probability of Co precipitation on the surface of the negative electrode increases, which may increase the negative electrode resistance. For this reason, when the metal oxide coating layer is further formed on the lithium cobalt oxide particles, the metal element included in the coating layer may react with HF preferentially over cobalt to protect the positive electrode active material particles. As a result, it is possible to effectively prevent deterioration of the cycle characteristics of a secondary battery at a high voltage.

The content of the metal element included in the coating layer may be controlled to 300 ppmw to 1,200 ppmw, based on the content of the lithium cobalt oxide of Formula 1. When the content of the metal element included in the coating layer is less than 300 ppmw, it is difficult to secure structural stability of the positive electrode active material. When the content is more than 1,200 ppmw, capacity and output characteristics of the battery are undesirably deteriorated.

Meanwhile, according to another embodiment of the present invention, provided is a method of preparing the above-described positive electrode active material of one embodiment. The preparation method may include dry-mixing a cobalt acid salt, a lithium precursor, and a doping precursor; and sintering the mixture at a temperature of 900° C. or higher.

The experimental results of the present inventors showed that the active material of one embodiment doped with at least part of the metal element M may be prepared by dry-mixing the precursors with each other, and sintering the mixture at a high temperature. Unlike this method, when wet methods, such as co-precipitation, etc., are applied, the active material is obtained in the form of a complex via a chemical bond between the metal element M and Formula 1, and thus it is likely that the positive electrode active material described herein may not be prepared.

In the above-described preparation method of another embodiment, the sintering temperature may be, for example, 900° C. to 1,200° C., and specifically, 1,000° C. to 1,100° C., and the sintering time may be 4 hours to 20 hours, and specifically, 5 hours to 15 hours.

When the sintering temperature is lower than 900° C., the structure of the lithium cobalt oxide may not be properly formed, and when the sintering temperature is higher than 1,200° C., lithium cobalt oxide is excessively sintered to cause deterioration of capacity or lifespan characteristics, which is undesirable. Further, when the sintering time is shorter than 4 hours, there is a problem in that sufficient doping may not occur, and when the sintering time is 12 hours or longer, physical and chemical properties of the lithium cobalt oxide may be changed to cause deterioration of performances, which is undesirable.

After the sintering process, the method may further include a process of forming a coating layer on the surface of the metal element M-doped lithium cobalt oxide. As described above, the coating layer may include one or more metal oxides selected from the group consisting of $Al_2O_3$, MgO, ZrO, $Li_2ZrO_3$, and $TiO_2$.

In one embodiment, to form the coating layer, a salt including a metal element which is intended to be included in the coating layer may be mixed with the doped lithium cobalt oxide, and then the mixture may be sintered. That is, the positive electrode active material on which the coating layer is formed may be prepared by applying the salt including the metal element onto the particle surface of the doped lithium cobalt oxide, followed by sintering.

Meanwhile, a kind of the cobalt oxide used in the above-described preparation method of another embodiment is not particularly limited, but the cobalt acid salt may be, for example, one or more selected from the group consisting of $Co_3O_4$, $CoCO_3$, $Co(NO_3)_2$, and $Co(OH)_2$, specifically, $Co_3O_4$ or $Co(OH)_2$.

The lithium precursor may be one or more selected from the group consisting of $Li_2CO_3$, LiOH, $LiNO_3$, $CH_3COOLi$, and $Li_2(COO)_2$, specifically, LiOH or $Li_2CO_3$.

The doping precursor may be one or more selected from the group consisting of one or more metals selected from the group consisting of Al, Ti, Mg, Mn, Zr, Ba, Ca, Ta, Mo, Nb, and metals having an oxidation number of +2 or +3, metal oxides thereof, and metal salts thereof, specifically, Al and/or Mg.

Meanwhile, according to still another embodiment of the present invention, provided is a positive electrode including the above-described positive electrode active material of one embodiment for a secondary battery.

The positive electrode may be manufactured by, for example, applying a positive electrode mix containing the positive electrode active material composed of positive electrode active material particles, a conductive material, and a binder onto a positive electrode collector, and if necessary, a filler may be further added to the positive electrode mix.

The positive electrode collector is generally fabricated to have a thickness of 3 μm to 500 μm. The positive electrode collector is not particularly limited as long as it has high conductivity without causing chemical changes in the corresponding battery. The positive electrode collector may be, for example, any one selected from stainless steel, aluminum, nickel, titanium, and aluminum or stainless steel that is surface-treated with carbon, nickel, titanium, or silver. Particularly, aluminum may be used. The collector may increase adhesion of the positive electrode active material by forming a fine roughness on the surface. For example, the collector may be in a variety of forms such as a film, a sheet, a foil, a net, a porous material, a foamed material, a non-woven fabric material, etc.

The positive electrode active material may be composed of, in addition to the positive electrode active material particles, a layered structure compound such as lithium nickel oxide ($LiNiO_2$), etc., or a compound substituted with one or more metals; a lithium manganese oxide such as a formula of $Li_{1+x}Mn_{2-x}O_4$ (wherein x is 0~0.33), $LiMnO_3$, $LiMn_2O_3$, $LiMnO_2$, etc.; lithium copper oxide ($Li_2CuO_2$); vanadium oxides such as $LiV_3O_8$, $LiV_3O_4$, $V_2O_5$, $Cu_2V_2O_7$, etc.; a Ni site type lithium nickel oxide represented by a formula $LiNi_{1-x}M_xO_2$ (wherein M is Co, Mn, Al, Cu, Fe, Mg, B or Ga, and x is 0.01 to 0.3); a lithium manganese complex oxide represented by a formula of $LiMn_{2-x}M_xO_2$ (wherein M is Co, Ni, Fe, Cr, Zn or Ta, and x is 0.01 to 1) or $Li_2Mn_3MO_3$ (wherein M is Fe, Co, Ni, Cu or Zn); $LiMn_2O_4$ wherein some Li of the formula is substituted with alkaline earth metals; disulfide compounds; $Fe_2(MoO_4)_3$, etc., but is not limited thereto.

The conductive material is generally added in an amount of 0.1 wt % to 30 wt % based on the total weight of the mixture including the positive electrode active material. The conductive material is not particularly limited, as long as it has conductivity without causing chemical changes in the corresponding battery. Examples of the conductive material may include graphite such as natural or artificial graphite; carbon black such as carbon black, acetylene black, Ketjen black, channel black, furnace black, lamp black, thermal black, etc.; conductive fibers such as carbon fibers, metallic fibers, etc.; metallic powders such as carbon fluoride, aluminum, nickel powder, etc.; conductive whiskers such as zinc oxide, potassium titanate, etc.; conductive metal oxides such as titanium oxide, etc.; polyphenylene derivatives, etc.

The binder included in the positive electrode is a component that assists in bonding between the active material and the conductive agent and bonding with respect to the collector, and may be generally added in an amount of 0.1 wt % to 30 wt % based on the total weight of the mixture including the positive electrode active material. Examples of the binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluorine rubber, various copolymers, etc.

According to still another embodiment, provided is a lithium secondary battery including the above-described positive electrode, a negative electrode, and an electrolyte. The kind of the lithium secondary battery is not particularly limited, but the lithium secondary battery may include, for example, lithium ion battery or a lithium ion polymer battery having advantages of high energy density, discharge voltage, output stability, etc.

Generally, the lithium secondary battery consists of a positive electrode, a negative electrode, a separator, and a non-aqueous electrolyte containing lithium salts.

Hereinafter, other components of the lithium secondary battery will be described.

The negative electrode may be fabricated by applying a negative electrode active material onto a negative electrode collector, followed by drying. If necessary, the above-described components may be further included, optionally.

The negative electrode collector is generally fabricated to have a thickness of 3 μm to 500 μm. The negative electrode collector is not particularly limited as long as it has conductivity without causing chemical changes in the corresponding battery. For example, copper, stainless steel, aluminum, nickel, titanium, calcined carbon, or copper or stainless steel surface-treated with carbon, nickel, titanium, silver, etc., aluminum-cadmium alloy, etc. may be used. Like the positive electrode collector, the negative electrode collector may have fine roughness on the surface thereof so as to reinforce adhesion of the negative electrode active material, and may be used in a variety of forms such as a film, a sheet, a foil, a net, a porous material, a foamed material, a non-woven fabric material, etc.

The negative electrode active material may include, for example, carbon such as non-graphitized carbon, graphitized carbon, etc.; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me:Mn, Fe, Pb, Ge; Me':Al, B, P, Si, Group I, II or III elements of the periodic table, halogen; $0<x\leq 1$; $1\leq y\leq 3$; $1\leq z\leq 8$), etc.; lithium metal; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$, etc.; conductive polymers such as polyacetylene, etc.; Li-Co-Ni-based materials.

The separator is interposed between the positive electrode and the negative electrode, and an insulating thin film having high ion permeability and mechanical strength is used. The separator generally has a pore diameter of 0.01 μm to 10 μm and a thickness of 5 μm to 300 μm. As the separator, for example, a sheet or non-woven fabric made of olefin polymer, such as polypropylene having chemical resistance and hydrophobicity, etc.; or a glass fiber or polyethylene is used. When a solid electrolyte such as a polymer, etc. is employed as the electrolyte, the solid electrolyte may also serve as both the separator and the electrolyte.

The lithium salt-containing non-aqueous electrolyte is composed of a non-aqueous electrolyte and lithium salt. The non-aqueous electrolyte may include a non-aqueous organic solvent, an organic solid electrolyte, or an inorganic solid electrolyte, but is not limited thereto.

The non-aqueous organic solvent may be, for example, a non-protic organic solvent, such as N-methyl-2-pyrrolidone, propylene carbonate, ethylene carbonate, butylene carbonate, dimethyl carbonate, diethyl carbonate, gamma butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

The organic solid electrolyte may include, for example, polyethylene derivatives, polyethylene oxide derivatives, polypropylene oxide derivatives, phosphoric acid ester polymer, polyagitation lysine, polyester sulfide, polyvinyl alcohol, polyvinylidene fluoride, a polymer containing ionic dissociation groups, etc.

The inorganic solid electrolyte may include, for example, Li-based nitrides, halides, or sulfates such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, etc.

The lithium salts are substance that are readily dissolved in the non-aqueous electrolyte, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroboran lithium, lower aliphatic carboxylic acid lithium, lithium tetraphenyl borate, imides, etc.

In order to improve charge/discharge characteristics and flame retardancy, for example, pyridine, triethyl phosphite, triethanolamine, cyclic ether, ethylene diamine, n-glyme, hexaphosphoric triamide, nitrobenzene derivatives, sulfur, quinoneimine dyes, N-substituted oxazolidinone, N,N-substituted imidazolidine, ethyleneglycol dialkylether, ammonium salts, pyrrol, 2-methoxy ethanol, aluminum trichloride, etc. may be added to the non-aqueous electrolyte. Optionally, halogen-containing solvents such as carbon tetrachloride or ethylene trifluoride may be further added in order to provide flame resistance, or carbon dioxide gas may be further added in order to enhance high-temperature retention properties, and FEC (Fluoro-Ethylene Carbonate), PRS (Propene sultone), etc. may be further added.

According to still another embodiment of the present invention, provided are a battery pack including the secondary battery, and a device including the battery pack. The above battery pack and device are known in the art, and therefore, specific descriptions thereof will be omitted in the present invention.

The device may be, for example, notebook computers, netbooks, tablet PC, mobile phones, MP3, wearable electronics, power tools, electric vehicles (EV), hybrid electric vehicles (HEV), plug-in hybrid electric vehicles (PHEV), E-bike, E-scooter, electric golf carts, or electric storage systems, etc., but is not limited thereto.

Effect of the Invention

As described above, a positive electrode active material according to the present invention in which lithium cobalt oxide having a layered structure is doped with one or more kinds of metal elements, and therefore, a predetermined amount or more of dopants is incorporated into and placed in the crystal lattice of the lithium cobalt oxide, thereby preventing collapse of the crystal structure and securing structural stability at a high voltage of more than 4.5 V.

Unlike the ternary system, the capacity of lithium cobalt oxide is increased only by increasing the voltage. However, when the positive electrode active material according to the present invention is used, a stability problem at high voltages may be solved, thereby achieving high capacity and high cycle characteristics.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION OF THE EMBODIMENTS

Hereinafter, embodiments of the present invention will be described with reference to drawings. However, the embodiments are provided only for better understanding, but the scope of the present invention is not limited thereby.

Preparation of Positive Electrode Active Material

Example 1

0.294 g of MgO, 80.27 g of $Co_3O_4$, and 36.94 g of $Li_2CO_3$ were dry-mixed with each other such that Mg was included in an amount of 3,000 ppm, based on the total weight of a positive electrode active material. Then, the mixture was sintered in a furnace at 1,050° C. for 10 hours to prepare a Mg-doped lithium cobalt oxide.

Example 2

0.147 g of $Al_2O_3$, 80.27 g of $Co_3O_4$, and 36.94 g of $Li_2CO_3$ were dry-mixed with each other such that Al was included in an amount of 3,000 ppm, based on the total weight of a positive electrode active material. Then, the mixture was sintered in a furnace at 1,050° C. for 10 hours to prepare an Al-doped lithium cobalt oxide.

Example 3

0.245 g of MgO, 80.27 g of $Co_3O_4$, and 36.94 g of $Li_2CO_3$ were dry-mixed with each other such that Mg was included in an amount of 5,000 ppm, based on the total weight of a positive electrode active material. Then, the mixture was sintered in a furnace at 1,050° C. for 10 hours to prepare an Mg-doped lithium cobalt oxide.

Example 4

0.343 g of MgO, 80.27 g of $Co_3O_4$, and 36.94 g of $Li_2CO_3$ were dry-mixed with each other such that Mg was included in an amount of 7,000 ppm, based on the total weight of a positive electrode active material. Then, the mixture was sintered in a furnace at 1,050° C. for 10 hours to prepare an Mg-doped lithium cobalt oxide.

Example 5

0.441 g of MgO, 80.27 g of $Co_3O_4$, and 36.94 g of $Li_2CO_3$ were dry-mixed with each other such that Mg was included in an amount of 9,000 ppm, based on the total weight of a positive electrode active material. Then, the mixture was sintered in a furnace at 1,050° C. for 10 hours to prepare an Mg-doped lithium cobalt oxide.

Example 6

To form a coating layer on the Mg-doped lithium cobalt oxide prepared in Example 1, 500 ppm of $Al_2O_3$ was dry-mixed with lithium cobalt oxide particles to coat the lithium cobalt oxide particles, and then sintered in a furnace at 700° C. for 5 hours to prepare a positive electrode active material on which the coating layer was formed.

Comparative Example 1

A Mg-doped lithium cobalt oxide was prepared in the same manner as in Example 1, except that Mg was included in an amount of 1,000 ppm, based on the total weight of the positive electrode active material.

Comparative Example 2

An Al-doped lithium cobalt oxide was prepared in the same manner as in Example 2, except that Al was included in an amount of 1,000 ppm, based on the total weight of the positive electrode active material.

Comparative Example 3

A Mg-doped lithium cobalt oxide was prepared in the same manner as in Example 1, except that Mg was included in an amount of 10,000 ppm, based on the total weight of the positive electrode active material.

Manufacture of Secondary Battery

Each of the metal-doped positive electrode active materials prepared in Examples 1 to 6, and Comparative Examples 1 to 3, a PVdF binder, and a natural graphite conductive material were mixed well at a weight ratio of 96:2:2 (positive electrode active material: binder: conductive material) in NMP, and then applied to an Al foil having a thickness of 20 μm, and dried at 130° C. to manufacture each positive electrode. As a negative electrode, a lithium foil was used, an electrolyte containing 1M $LiPF_6$ in a solvent of EC:DMC:DEC=1:2:1 was used to manufacture each coin-type half cell.

EXPERIMENTAL EXAMPLE 1

Analysis of Capacity Retention Ratio

Each of the coin-type half cells manufactured above was charged at 0.5 C to an upper voltage limit of 4.5 V or 4.55 V at 25° C., and then discharged at 1.0 C to a lower voltage limit of 3 V. This procedure was regarded as 1 cycle, and capacity retention ratios after 50 cycles were measured. The results are shown in the following Table 1 and FIGS. 1 to 4. Table 2 shows initial capacities when charged at 4.5 V and 4.55 V, respectively.

TABLE 1

|  | Capacity retention ratio(%) after 50 cycles | |
| --- | --- | --- |
| Upper voltage limit | 4.5 V | 4.55 V |
| Example 1 (Mg, 3,000 ppm) | 72 | 89 |
| Example 2 (Al, 3,000 ppm) | 93 | 89 |
| Example 3 (Mg, 5,000 ppm) | 70 | 89 |
| Example 4 (Mg, 7,000 ppm) | 72 | 90 |
| Example 5 (Mg, 9,000 ppm) | 72 | 91 |
| Example 6 (Example 1 + formation of coating layer) | 80 | 92 |
| Comparative Example 1 (Mg, 1,000 ppm) | 92 | 73 |
| Comparative Example 2 (Al, 1,000 ppm) | 96 | 73 |
| Comparative Example 3 (Mg, 10,000 ppm) | 69 | 85 |

TABLE 2

|  | 4.5 V | | 4.55 V | |
| --- | --- | --- | --- | --- |
| Upper voltage limit | Initial charge capacity (mAh/g) | Initial efficiency | Initial charge capacity (mAh/g) | Initial efficiency |
| Example 1 (Mg, 3,000 ppm) | 195 | 95.3 | 215 | 95.2 |

TABLE 2-continued

| | 4.5 V | | 4.55 V | |
|---|---|---|---|---|
| Upper voltage limit | Initial charge capacity (mAh/g) | Initial efficiency | Initial charge capacity (mAh/g) | Initial efficiency |
| Example 2 (Al, 3,000 ppm) | 193 | 94.7 | 212 | 94.5 |
| Example 3 (Mg, 5,000 ppm) | 193 | 94.5 | 213 | 94.4 |
| Example 4 (Mg, 7,000 ppm) | 194 | 94.0 | 212 | 93.8 |
| Example 5 (Mg, 9,000 ppm) | 194 | 93.2 | 208 | 93.3 |
| Example 6 (formation of coating layer) | 195 | 97.0 | 215 | 96.7 |
| Comparative Example 1 (Mg, 1,000 ppm) | 196 | 97.3 | 220 | 97.2 |
| Comparative Example 2 (Al, 1,000 ppm) | 196 | 97.2 | 218 | 97.3 |
| Comparative Example 3 (Mg, 10,000 ppm) | 190 | 92.5 | 205 | 92.0 |

Figure 1:
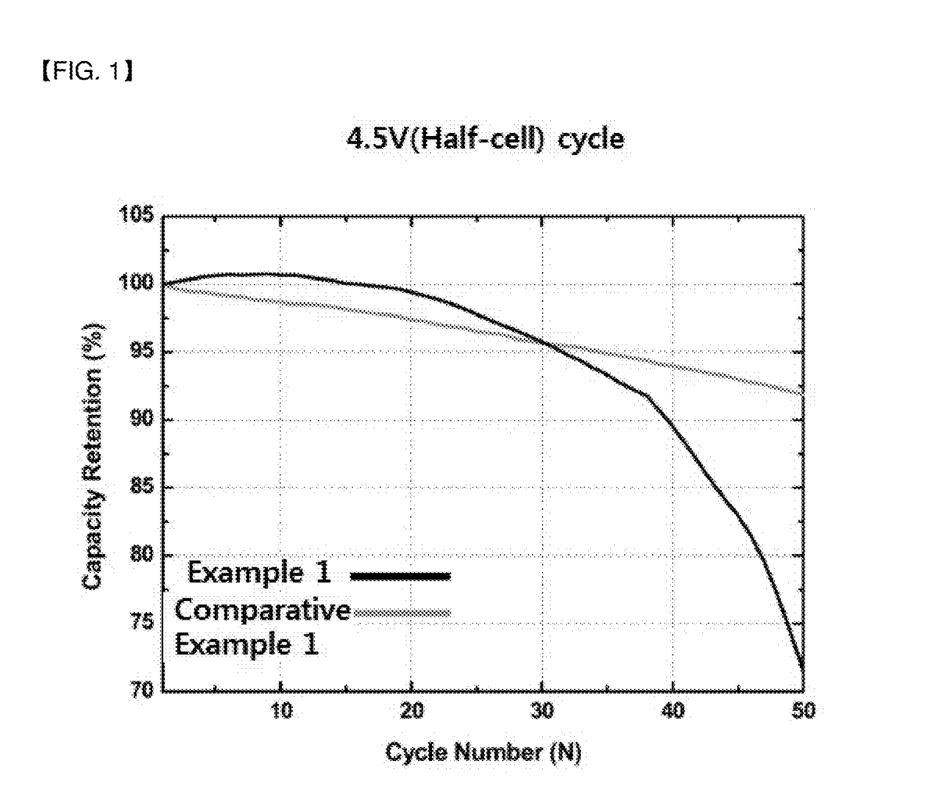
FIG. 1 is a graph showing a capacity retention ratio of a coin-type half cell including a lithium cobalt oxide doped with Mg of 1,000 ppm or 3,000 ppm, when charged at an upper voltage limit of 4.5 V.
Figure 2:
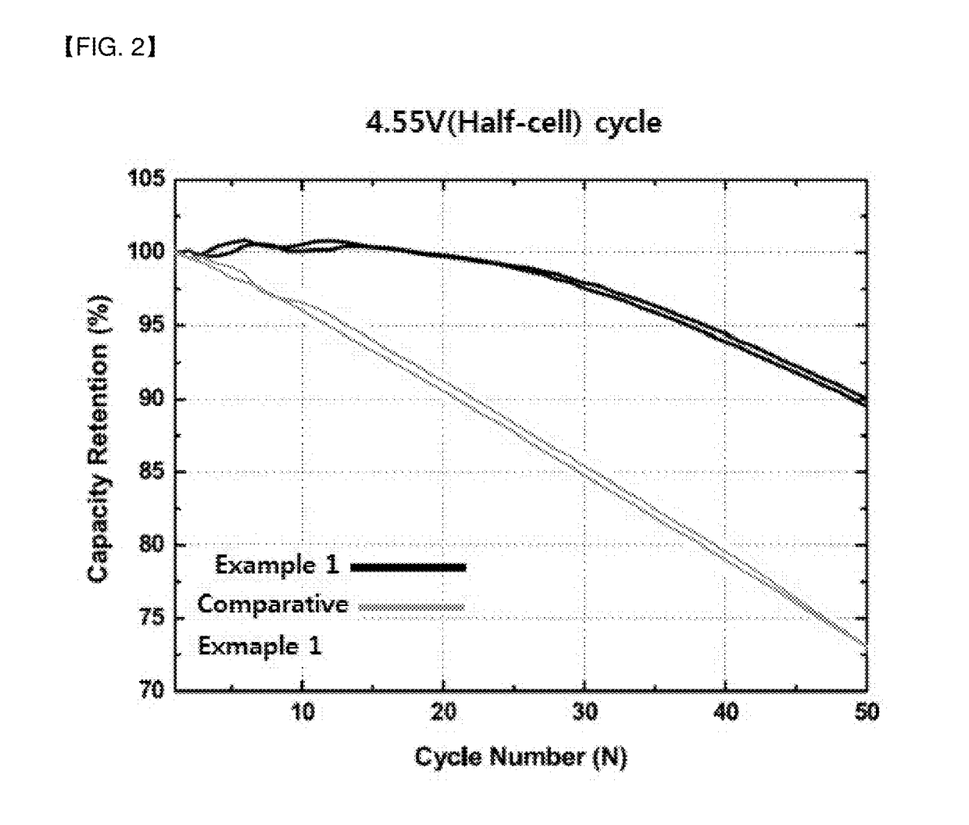
FIG. 2 is a graph showing a capacity retention ratio of the coin-type half cell including the lithium cobalt oxide doped with Mg of 1,000 ppm or 3,000 ppm, when charged at an upper voltage limit of 4.55 V.
Figure 3:
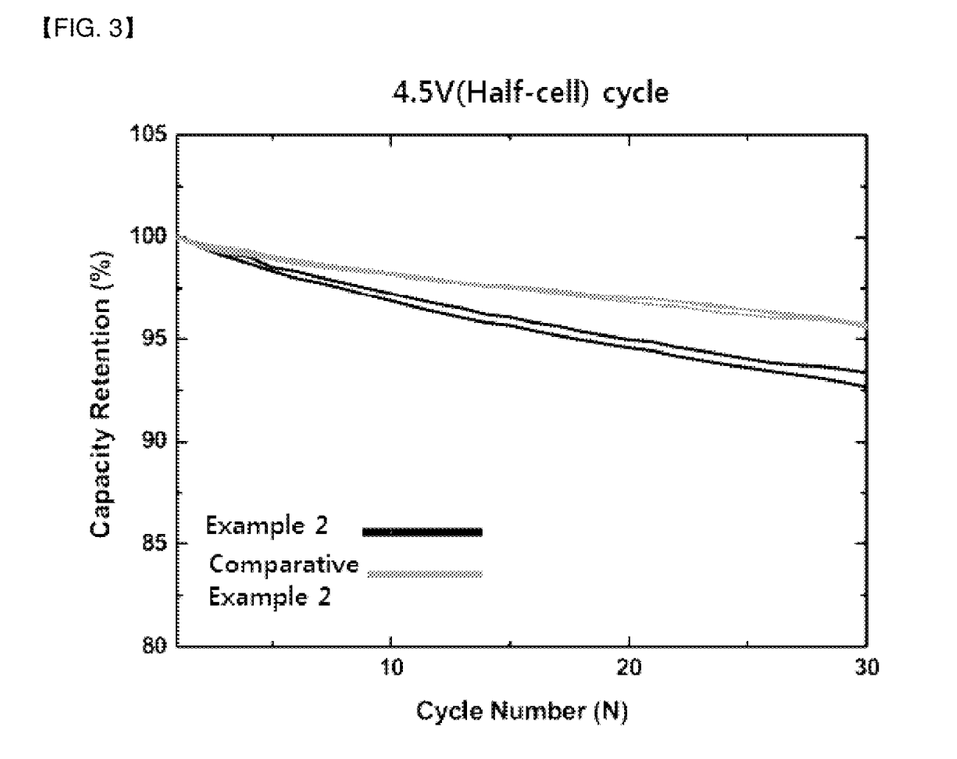
FIG. 3 is a graph showing a capacity retention ratio of a coin-type half cell including a lithium cobalt oxide doped with Al of 1,000 ppm or 3,000 ppm, when charged at an upper voltage limit of 4.5 V.
Figure 4:
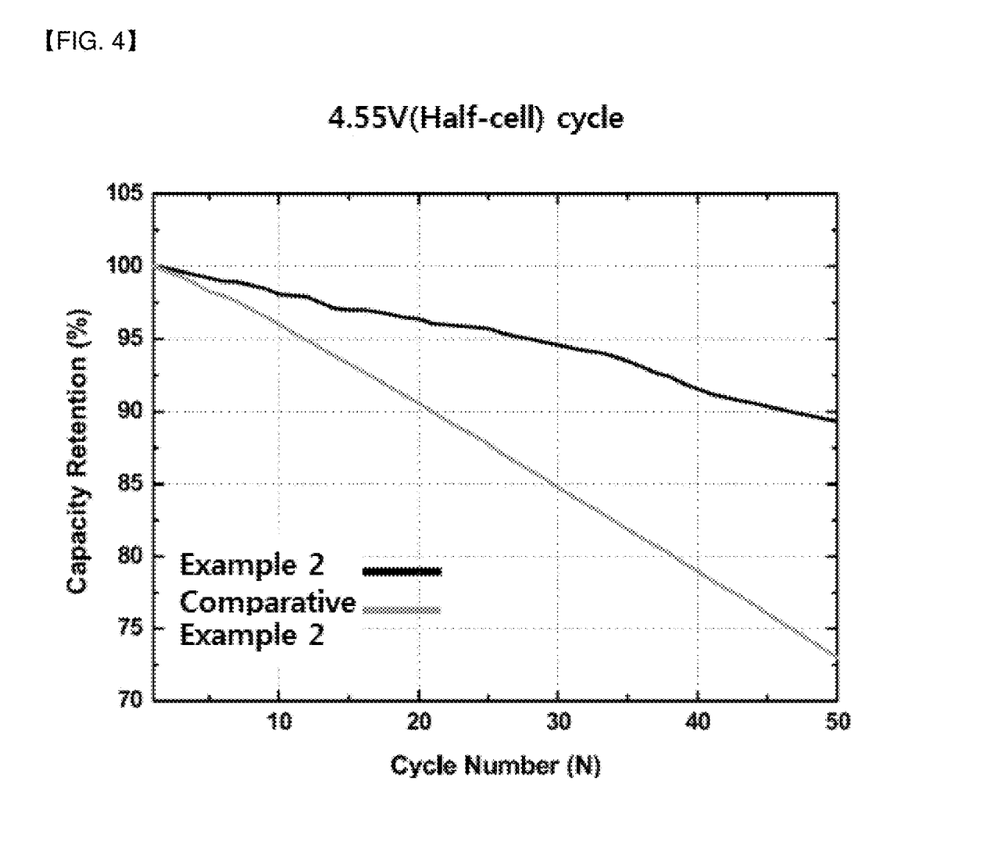
FIG. 4 is a graph showing a capacity retention ratio of the coin-type half cell including the lithium cobalt oxide doped with Al of 1,000 ppm or 3,000 ppm, when charged at an upper voltage limit of 4.55 V.

Referring to Table 1, FIGS. 1 to 4, and Table 2, when 3,000 ppm of Mg or Al was doped as in Examples 1 or 2, the capacity retention ratio was lower than that of Comparative Example 1 or 2 doped with 1,000 ppm of Mg or Al, after 50 cycles of charge/discharge at 4.5 V. FIG. 1 shows that when the positive electrode active material of Example 1 was used, the capacity retention ratio was higher than that of Comparative Example 1 up to about 30 cycles, but the capacity retention ratio of Example 1 was rapidly decreased over 30 cycles.

However, after 50 cycles of charge/discharge at 4.55 V, Examples 1 and 2 having the higher doping contents showed remarkably higher capacity retention ratios.

Example 2 having the Al doping content of 3,000 ppm showed a lower capacity retention ratio at 4.5 V than 4.55 V. However, its capacity retention ratio was decreased at 4.5 V whereas its capacity retention ratio was increased at 4.55 V, as compared with Comparative Example 1 having the Al doping content of 1,000 ppm.

Meanwhile, Comparative Example 2 having the Mg doping content of 10,000 ppm showed a low capacity retention ratio, as compared with Examples.

This is because the positive electrode active material undergoes a reversible phase transition during charge/discharge processes, and the reversibility of the phase transition is reduced with increasing charge potential, leading to reduction in the capacity. However, when lithium cobalt oxide is doped with a metal within a particular range in order to prepare a high potential lithium cobalt oxide with high capacity, an irreversible phase transition may be minimized to prevent the decrease of the capacity retention ratio. However, when the doping metal content is too small as in Comparative Examples 1 and 2, it is difficult to obtain the above effect, and thus the capacity retention ratio is rapidly decreased during charge/discharge processes at 4.55 V.

Accordingly, when lithium cobalt oxide is doped with Mg or Al within a particular content range, the phase transition at a high potential may be minimized to exhibit the high capacity retention ratio.

Further, as the content of the doping element is increased, the initial efficiency is reduced at a voltage of higher than 4.5 V, and thus it is expected to easily balance the positive electrode and the negative electrode at the time of manufacturing a battery cell. It is also expected that the remaining amount of the positive electrode active material is decreased, which will help to reduce the production cost of battery cells. Accordingly, it is expected that materials suitable for operating voltage conditions of battery cells may be designed, performances required for the battery cells may be realized, and the production cost may be greatly reduced.

Meanwhile, at 4.55 V, as the doping amount of Mg was increased, the lifespan was slightly improved, which is presumably attributed to structural stabilization. However, at 4.55 V, as the doping amount of Mg was increased, the initial efficiency was decreased. It is expected that when the doping amount of Mg is increased to 10,000 ppm or more, the resistance increase of the positive electrode active material, rather than structural stability, may be further promoted, capacity may be deteriorated, and the lifespan stability may be reduced.

Meanwhile, after 50 cycles of charge/discharge at 4.55 V, the doped lithium cobalt oxide having the coating layer of Example 6 exhibited a high capacity retention ratio, as compared with Example 1 having no coating layer.

Accordingly, it can be seen that the positive electrode active materials of Examples exhibit improved lifespan characteristics at a potential of higher than 4.5 V.

EXPERIMENTAL EXAMPLE 2

TOF-SIMS (Time of Flight Secondary Ion Mass Spectrometry) Analysis

Figure 5:
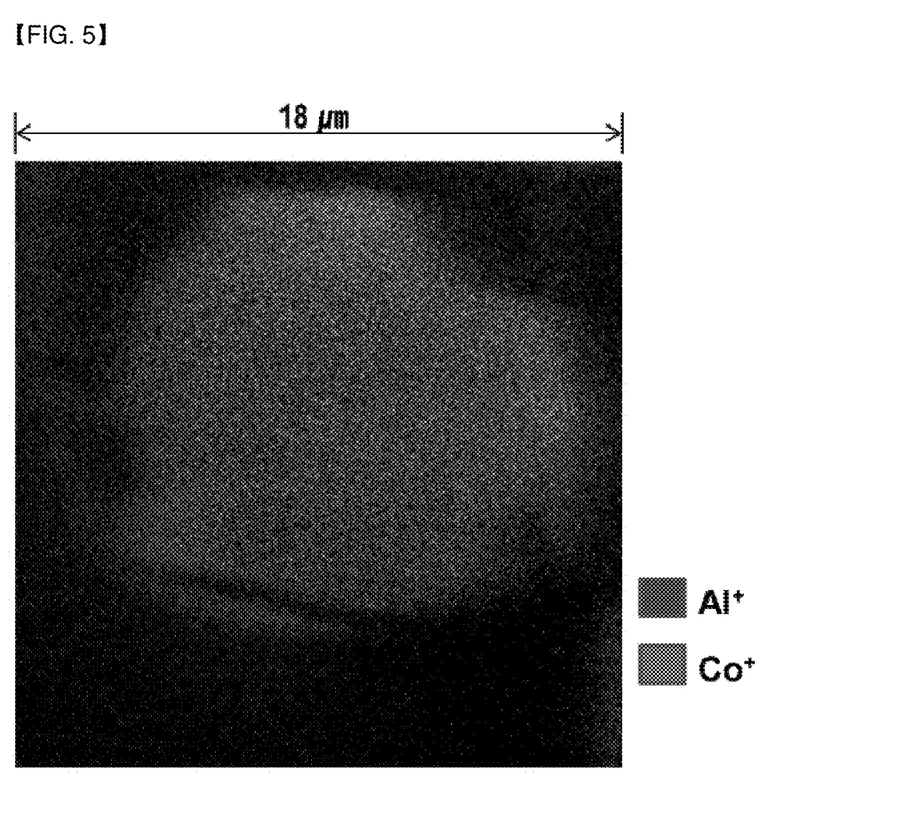
FIG. 5 shows the result of TOF-SIMS (Time of flight secondary ion mass spectrometry) analysis of a positive electrode active material of Example 1.

The result of analyzing the active material obtained in Example 2 by TOF-SIMS (Time of flight secondary ion mass spectrometry) is shown in FIG. 5.

Referring to FIG. 5, it was confirmed that the doped metal element Al was distributed on the lithium cobalt oxide, and in particular, the doped metal element Al was predominantly distributed in the region close to the surface of the lithium cobalt oxide. These analysis results indicate that the metal element Al was doped into the lithium cobalt oxide to form a physical/crystallographic connection without complex formation via a chemical bond with lithium cobalt oxide.

EXPERIMENTAL EXAMPLE 3

XRD Analysis

In order to examine changes in the crystal structures of the lithium cobalt oxides of Example 1 and Comparative Example 1, coin-type half cells including the same were manufactured, and peak intensity was measured while increasing the upper limit voltage from 4.5 V to 4.55 V at 0.01 V intervals. The XRD graphs (2-theta-scale) thus measured are shown in FIG. 6.

Referring to FIG. 6, the positive electrode active material of Example 1 showed a peak corresponding to the (003) plane in the crystal structure of lithium cobalt oxide in the range of 23 to 24 degree when measured at a positive electrode potential of 4.40 V to 4.55 V and a peak in the range of 24 to 25 degree when measured at a positive electrode potential of 4.55 V. When the charge potential of the positive electrode active material is 4.54 V or higher, the crystal structure undergoes a phase transition to another phase, and when the charge potential is 4.55 V, a new peak indicating the crystal structure after phase transition is observed in the range of 24 to 25 degree. However, the peak corresponding to the (003) plane was observed continuously, indicating that the phase transition reversibly occurred.

Therefore, even during charge/discharge processes, the capacity retention ratio may be maintained.

Specifically, FIG. 6 shows peaks before/after phase transition at each voltage. A peak intensity of a peak corresponding to the (003) plane when measured at a positive electrode potential of 4.55 V was 30% or more of a peak intensity of the peak corresponding to the (003) plane when measured at 4.50 V. The metal-doped lithium cobalt oxides minimized the phase transition to exhibit high capacity retention ratios, thereby exhibiting remarkably improved lifespan characteristics.

However, the positive electrode active material of Comparative Example 1 showed a remarkably low peak intensity of the peak corresponding to the (003) plane when measured at 4.55 V, and a peak indicating the crystal structure after phase transition was higher than a peak indicating the crystal structure before phase transition, suggesting that reversibility of the phase transition was remarkably decreased. Accordingly, it can be seen that when the doping metal content is low, lifespan characteristics may be greatly deteriorated.

It will be apparent to those skilled in the art to which the present invention pertains that various modifications and changes may be made thereto without departing from the scope of the invention.

The invention claimed is:

1. A positive electrode active material, comprising:
M-doped lithium cobalt oxide particles, the particles comprising:
a lithium cobalt oxide represented by the following Formula 1, the lithium cobalt oxide has a layered crystal structure; and
a metal element (M) which is incorporated into the lithium cobalt oxide and does not form a chemical bond with the elements of the lithium cobalt oxide,
wherein M is present in an amount of 0.3 parts by weight to 0.9 part by weight with respect to 100 parts by weight of the lithium cobalt oxide,
wherein M is Mg,
wherein the layered crystal structure is maintained at a positive electrode potential of more than 4.5 V based on Li potential:

$$Li_{1+x}Co_{1-x}O_2 \qquad \text{[Formula 1]}$$

wherein x satisfies $0 \leq x \leq 0.2$.

2. The positive electrode active material of claim 1, wherein the layered crystal structure is maintained when the positive electrode potential ranges from more than 4.5 V to 4.8 V or less.

3. The positive electrode active material of claim 1, wherein a peak intensity of an X-ray diffraction (XRD) peak corresponding to the (003) plane of the layered crystal structure when measured at a positive electrode potential of 4.55 V is 30% or more of a peak intensity of the XRD peak corresponding to the (003) plane when measured at a positive electrode potential of 4.50 V.

4. The positive electrode active material of claim 1, wherein a peak intensity of an X-ray diffraction (XRD) peak corresponding to the (003) plane of the layered crystal structure when measured at a positive electrode potential of 4.55 V is 40% or more of a peak intensity of the XRD peak corresponding to the (003) plane when measured at a positive electrode potential of 4.50 V.

5. The positive electrode active material of claim 1, further comprising:
a coating layer which is formed on the M-doped lithium cobalt oxide particles, wherein the coating layer includes one or more metal oxides selected from the group consisting of $Al_2O_3$, MgO, ZrO, $Li_2ZrO_3$, and $TiO_2$.

6. A lithium secondary battery comprising a positive electrode including the positive electrode active material of claim 1; a negative electrode; and an electrolyte.

7. The lithium secondary battery of claim 6, wherein at a positive electrode potential of 4.55 V (based on Li potential) when fully charged, a capacity retention ratio after 50 cycles of charge/discharge is 85% or more of an initial capacity.

8. A method of preparing the positive electrode active material of claim 1, the method comprising:
dry-mixing a cobalt acid salt, a lithium precursor, and a doping precursor; and
sintering the mixture at a temperature of 900° C. or higher to form the M-doped lithium oxide particles.

9. The method of claim 8, further comprising:
forming a metal oxide coating layer on the M-doped lithium cobalt oxide particles.

10. The method of claim 8, wherein the sintering temperature ranges from 900° C. to 1200° C.

11. The method of claim 8, where the sintering is performed for a time period ranging from 4 hours to 12 hours.

* * * * *